US012344102B2

(12) United States Patent
Lobo et al.

(10) Patent No.: US 12,344,102 B2
(45) Date of Patent: Jul. 1, 2025

(54) VEHICLE VOLTAGE CONTROL

(71) Applicant: Rivian IP Holdings, LLC, Plymouth, MI (US)

(72) Inventors: Kyle Lobo, Westchester, CA (US); Tylynn Haddow, Irvine, CA (US); Tae Hoon Park, Irvine, CA (US); Terrin Chan, San Diego, CA (US); Sanjeewa Keven Sugatapala, Long Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 21 days.

(21) Appl. No.: 18/184,702

(22) Filed: Mar. 16, 2023

(65) Prior Publication Data

US 2024/0308355 A1    Sep. 19, 2024

(51) Int. Cl.
*B60L 15/20* (2006.01)
*B60L 58/12* (2019.01)
*H02J 7/00* (2006.01)

(52) U.S. Cl.
CPC ........... *B60L 15/2045* (2013.01); *B60L 58/12* (2019.02); *H02J 7/0013* (2013.01); *H02J 7/0048* (2020.01); *H02J 7/00712* (2020.01); *B60L 2240/547* (2013.01); *H02J 7/0029* (2013.01); *H02J 2207/20* (2020.01)

(58) Field of Classification Search
CPC ................. B60L 15/2045; B60L 58/12; B60L 2240/547; H02J 7/0013; H02J 7/0048; H02J 7/00712; H02J 7/0029; H02J 2207/20
See application file for complete search history.

(56) References Cited

U.S. PATENT DOCUMENTS

2012/0316749 A1* 12/2012 Ubukata ............. F02N 11/0866
                                                701/102
2013/0038127 A1*  2/2013 King .................... B60L 58/20
                                                 307/64

* cited by examiner

*Primary Examiner* — Rexford N Barnie
*Assistant Examiner* — Thai H Tran
(74) *Attorney, Agent, or Firm* — Foley & Lardner LLP

(57) ABSTRACT

Systems and methods to control voltage in a vehicle are provided. The system may include a voltage converter. The voltage converter can adjust a voltage from a battery to a first setpoint. The system can include a processor couple with memory. The processor can detect an event at one or more loads. The processor can adjust the first setpoint to a second point to power the one or more loads.

17 Claims, 5 Drawing Sheets

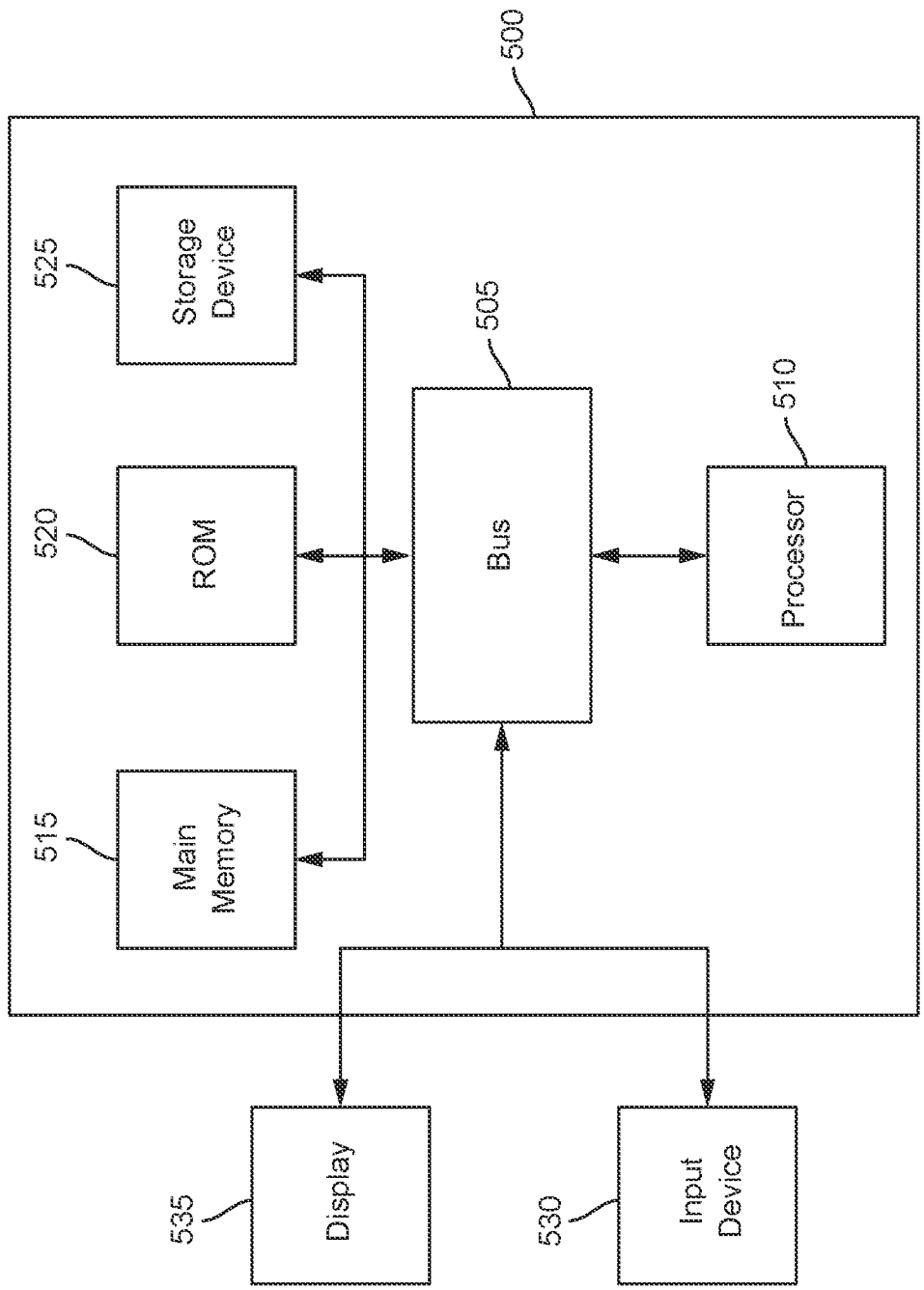

VEHICLE VOLTAGE CONTROL

INTRODUCTION

A vehicle, such as an electric vehicle, can include multiple loads. The loads can be powered by a battery of the vehicle.

SUMMARY

This disclosure is generally directed to adjusting the voltage from a battery to increase or decrease the amount of power that is available for powering devices of a vehicle or system. Devices in a vehicle can be constant power devices. Constant power devices can be connected to the battery via a bus and draw the same amount of power regardless of the voltage. Boosting the voltage can decrease the current draw on the bus. Boosting the voltage can boost the amount of power that is available for the constant power devices and other devices connected to the bus.

At least one aspect is directed to a system. The system can include a voltage converter. The voltage converter can be configured to adjust a voltage from a battery to a first setpoint. The system can include a processor and a memory. The processor can be coupled with the memory. The processor can detect an event at one or more loads. The processor can, responsive to detecting the event, adjust the first setpoint to a second setpoint to power the one or more loads.

At least one aspect is directed to a method. The method can include adjusting, by a voltage converter, a voltage from a battery to a first setpoint. The method can include detecting, by a processor, an event at one or more loads. The method can include, responsive to detecting the event, adjusting, by the processor, the first setpoint to a second setpoint. The method can include powering the one or more loads based on the second setpoint.

At least one aspect is directed to a vehicle. The vehicle can include a battery electrically coupled with one or more loads of the vehicle. The vehicle can include a voltage converter connected to the battery and the one or more loads. The voltage converter can adjust a voltage from the battery to a first setpoint. The vehicle can include a processor and a memory. The processor can be coupled with the memory. The processor can detect an event. Responsive to detecting the event, the processor can adjust the first setpoint to a second setpoint to power the one or more loads.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a block diagram illustrating an example architecture for a computer system that can be employed to implement elements of the systems and methods described and illustrated herein.

DETAILED DESCRIPTION

Figure 1:
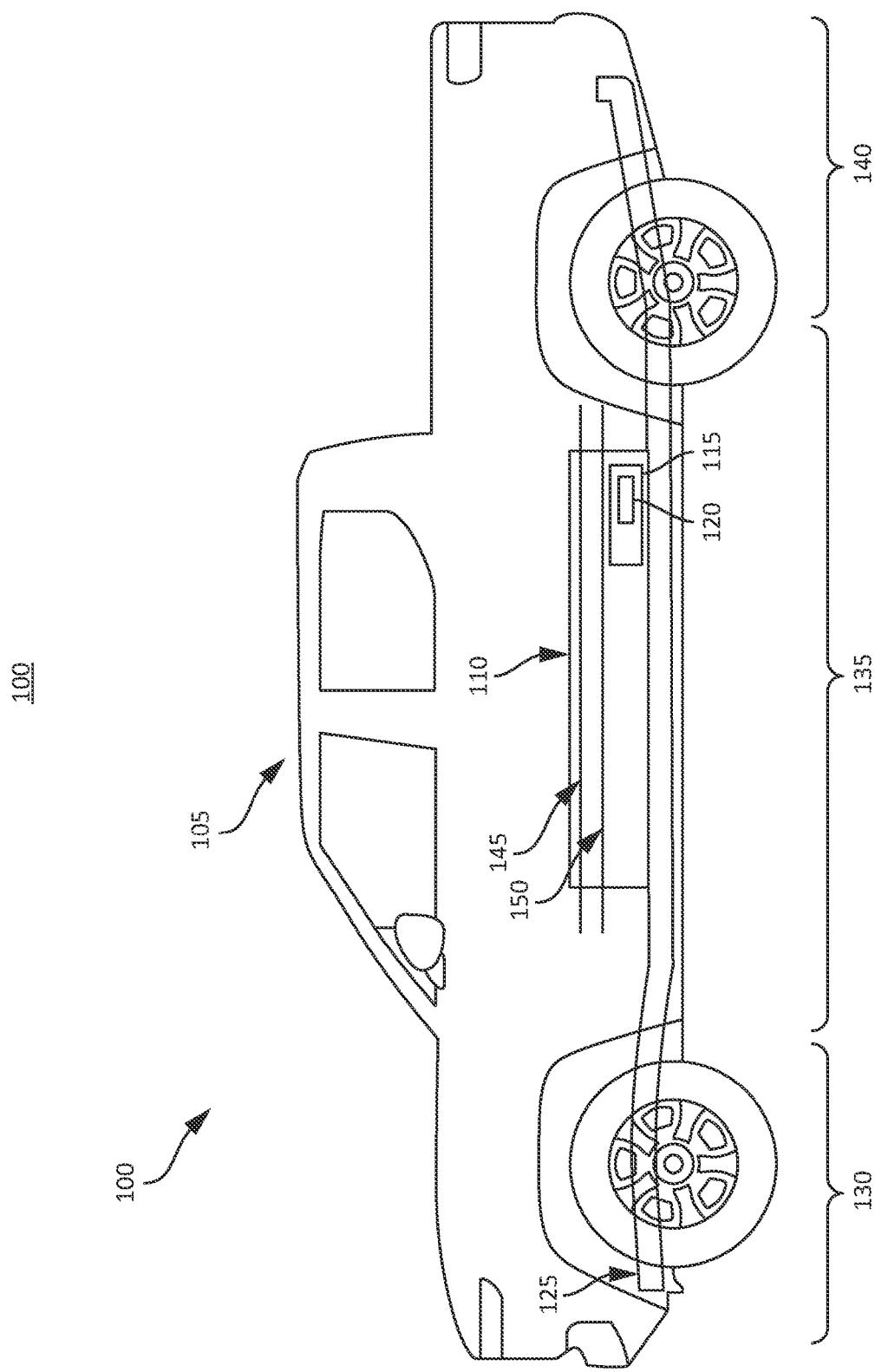
FIG. 1 depicts an example vehicle, in accordance with some implementations.

Following below are more detailed descriptions of various concepts related to, and implementations of, methods, apparatuses, and systems of voltage control. The various concepts introduced above and discussed in greater detail below may be implemented in any of numerous ways.

In an automotive power system, the bus voltage can be dictated by a battery float voltage of the system. Because power supplies can be current limited devices, it can be challenging to sustain high power demands on active loads for longer durations. When a load (e.g., a device of the system) is activated, the power supplies can reach their current limit. Reaching the current limit can cause a low-voltage battery of the system to begin to provide power to the activated load, thus draining the low-voltage battery. Conventional solutions to solving this problem can involve incorporating extra power supplies into the system. However, these extra power supplies can incur costly additional hardware and mass to the system or vehicle.

To solve these and other technical challenges, a controller can control the setpoint of a voltage converter of an automotive power system. The controller can detect the changes in state of loads of the system that cause an increased need for power to operate. The controller can adjust (e.g., increase) the setpoint of the voltage converter. Since many loads in an automotive system can be constant power devices, upon activation, the loads can draw the same amount of power regardless of the voltage at the devices. Accordingly, by increasing the voltage output of the voltage converter, the controller can operate the activated devices while maintaining or reducing the current draw on the bus connecting the loads to the power supplies. Controlling the setpoint of the voltage converter in this manner can boost the power that is available to the loads without violating the current limits set for the power supplies and without incurring extra cost or weight from an additional power supply.

Controlling the setpoint of a voltage converter of an automotive power system can facilitate operation of different types of loads. For example, the controller can dynamically change the output voltage of the voltage converter as different loads activate or deactivate to ensure the loads can operate. Constant resistance loads, such as brushed motors, can require more voltage to operate. Components such as blowers, solenoids, latch motors, and window motors can require additional power during high-torque events. The controller can monitor the status of each of such components of the system to adjust the output setpoint of the voltage converter to facilitate operation of the components without violating the current limits of the available power supplies. Controlling the setpoint can provide a temporary power boost in applications such as winching or powering external loads.

To control the setpoint of the voltage converter of the automotive power system, the controller can determine a type of event that triggered the requirement for more power to be available. For example, the controller can detect an activation of a window motor or a current draw of the voltage converter that exceeds a threshold. Responsive to detecting such events, the controller can use a power equation (e.g., power=current times voltage) to determine a new voltage setpoint for the voltage converter that satisfies the power requirements of the activated devices according to a set of or defined current (e.g., a current that abides by the current limits of the power supplies supplying power to the activated loads). The controller can adjust the voltage converter to have the new voltage setpoint. Thus, the controller can control the voltage converter to power activated loads without violating current limits of power supplies providing power to the activated loads.

FIG. 1 depicts an example cross-sectional view 100 of a vehicle 105 installed with at least one battery pack 110. The vehicle 105 can be an electric vehicle. The vehicle 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. The vehicles 105 can be fully electric or partially electric (e.g., plug-in hybrid) and further, vehicles 105 can be fully autonomous, partially autonomous, or unmanned. The vehicles 105 can also be human operated or non-autonomous. The vehicles 105 such as electric trucks or automobiles can include on-board battery packs 110, batteries 115 or battery modules 115, or battery cells 120 to power the electric vehicles. The vehicle 105 can include a chassis 125 (e.g., a frame, internal frame, or support structure). The chassis 125 can support various components of the vehicle 105. The chassis 125 can span a front portion 130 (e.g., a hood or bonnet portion), a body portion 135, and a rear portion 140 (e.g., a trunk, payload, or boot portion) of the vehicle 105. The battery pack 110 can be installed or placed within the vehicle 105. For example, the battery pack 110 can be installed on the chassis 125 of the vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the vehicle 105 to provide electrical power to various systems or components of the vehicle 105.

Figure 2:
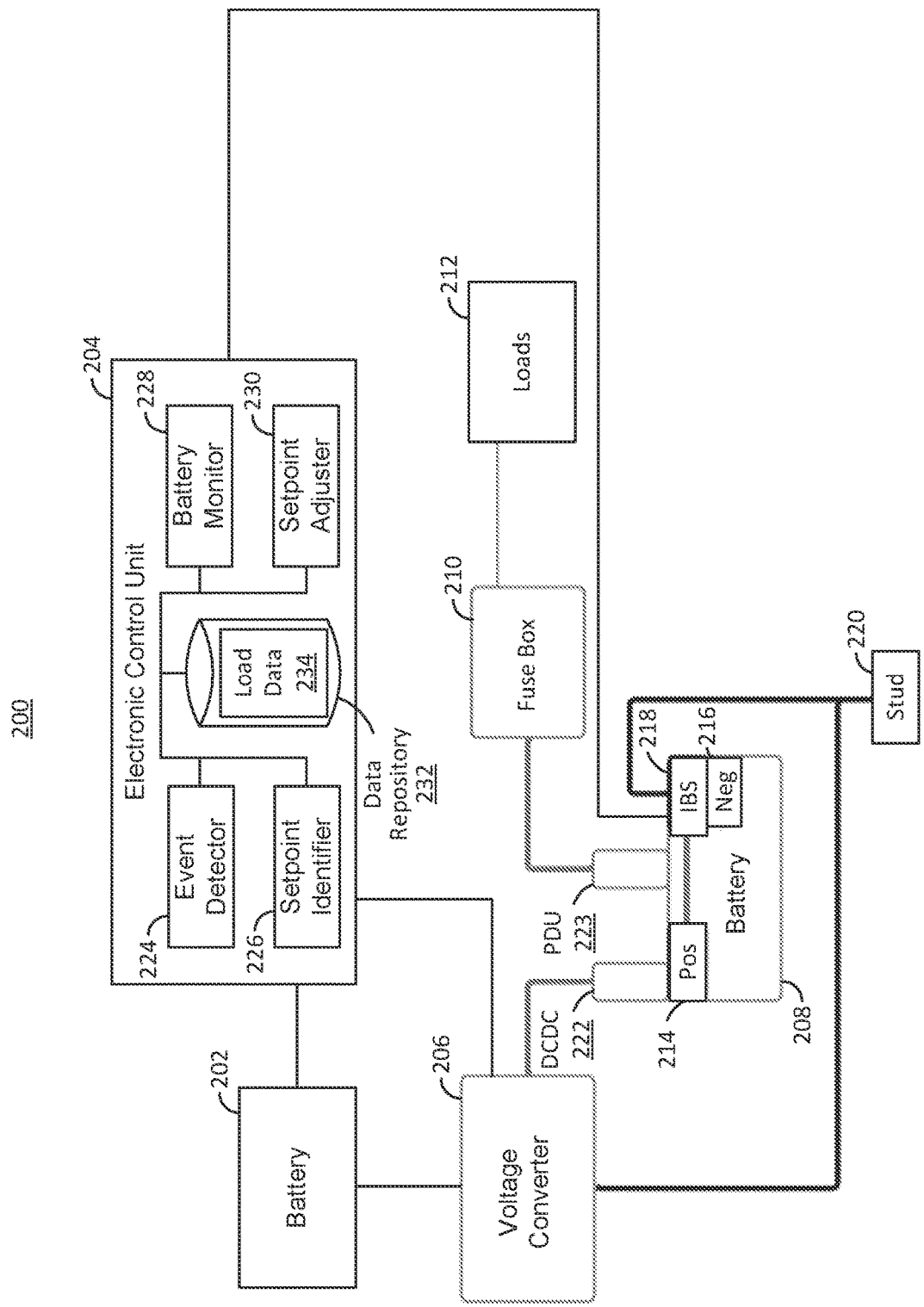
FIG. 2 depicts an example system for voltage control, in accordance with some implementations.

FIG. 2 depicts an example system 200 for voltage control. The system 200 can include a battery 202 (e.g., a first battery or the battery 115), an electronic control unit 204, a voltage converter 206, a battery 208 (e.g., a second battery), a fuse box 210, and loads 212. The components 202-214 of the system 200 can be components of a vehicle (e.g., the vehicle 105). The components 202-210 can operate together to provide power to the loads 212. For example, the loads 212 can require a set amount of power to operate. The battery 202 can provide power to the loads 212 through the voltage converter 206, the battery 208, and the fuse box 210. The electronic control unit 204 can control the voltage setpoint of the voltage converter 206. The battery 202 can provide current with a voltage that is too high to power the loads 212. Accordingly, the voltage converter 206 can reduce the voltage of the current that travels through the battery 208 to the setpoint established by the electronic control unit 204. The reduced voltage current that is provided by the battery 202 and current provided by the battery 208 can power the loads 212 through the fuse box 210.

The loads 212 can be or include one or more loads of a vehicle. The loads 212 can each be a component of the vehicle that requires power to operate. Some examples of the loads 212 include constant resistance loads, such as brushed motors, that can require more voltage to get more power. Some examples of the loads 212 can include blowers, winches, lights, solenoids, latch motors, and window motors, which can require additional power during high-torque events (e.g., sudden changes in state or activation). The loads 212 can be electrically coupled (e.g., connected) to the battery 202 or the battery 208. The loads 212 can be or include one or more constant power devices, which can draw the same amount of power regardless of the voltage at the devices. Accordingly, an increase in voltage provided to the loads 212 can correspond to or cause a decrease in current that the loads draws from the battery 202 or the battery 208.

The battery 202 can be a battery of a vehicle (e.g., the vehicle 105). The battery 202 can have a high voltage. In other words, the battery 202 can be a high voltage battery. A high voltage can be a voltage of 400 volts (V) or otherwise a voltage in the range of 300V to 800V, for example. The battery 202 can have a higher voltage than the battery 208. The battery 202 can be configured to provide power to facilitate operation of the vehicle. For instance, the battery 202 can be electrically coupled to the loads 212 to provide power to the loads 212. The battery 202 can be the only battery that is configured to provide power to the loads 212. The battery 202 can provide power to the loads 212 in combination with the battery 208.

The battery 208 can be a battery of a vehicle (e.g., the vehicle 105). The battery 208 can have a low voltage. In other words, the battery 208 can be a low voltage battery. A low voltage can be 12V or a voltage within the range of 5V to 20V, for example. The battery 208 can have a lower voltage than the battery 202. The battery 208 can be electrically coupled (e.g., coupled in series or coupled between) with the battery 202 or the loads 212. The battery 208 can provide power to the loads 212 in combination with the battery 202 (e.g., current can flow from the battery 202 through the battery 208 to the loads 212).

The battery 208 can include a positive terminal 214, a negative terminal 216, and an intelligent battery sensor (IBS) 218. The negative terminal 216 and the intelligent battery sensor 218 can be located at the same location of the battery 208 (e.g., the intelligent battery sensor 218 can be electrically coupled (e.g., directly coupled or connected) to the negative terminal 216). In some examples, the negative terminal 216 and the intelligent battery sensor 218 can be located at different locations of the battery 208. Current can flow from the battery 202, via the voltage converter 206, to the positive terminal 214 of the battery 208 through the negative terminal 216 of the battery 208. Current can flow from the negative terminal 216 to the loads 212 and to a stud 220 (e.g., ground or a grounding component within the system 200).

The IBS 218 can be or include a sensor that monitors the condition of the battery 208. The IBS 218 can monitor the state of the battery 208, such as the voltage, current, temperature, capacity, or other suitable conditions of the battery 208. For example, the IBS 218 can include circuitry to determine the state of charge and health (e.g., capacity) of the battery 208 based on data the IBS 218 collects. The IBS 218 can also generate data on how the battery 208 is being used and the remaining life expectancy of the battery 208. The IBS 218 can transmit the collected or calculated data to the electronic control unit 204. The electronic control unit 204 can use the data to control charging or discharging of the battery 208. The IBS 218 can have or include built-in protection circuits to protect the battery 208 from overcharging, over-discharging, or short-circuiting. In some examples, the battery 202 can have a similar IBS.

The fuse box 210 can be or include a fuse panel or breaker box. The fuse box 210 can be a power distribution unit (PDU) fuse box. The fuse box 210 can distribute electrical power throughout the system 200 (e.g., to the loads 212) or to components of a vehicle (e.g., the vehicle 105) in which the system 200 is located. The fuse box 210 can include one or more fuses. The fuses can be configured to protect a specific circuit or group of circuits from overloading. For example, when too much current flows through a circuit, heat can be generated on the circuit, which can cause damage to the wiring and electrical components. A fuse of the fuse box 210 can be designed to melt or "blow" when the current exceeds a certain level, cutting off power to that circuit and preventing damage to loads 212 connected to the circuit. The fuse box 210 can include or contain a main switch or breaker. The switch or breaker can be used to turn off power to the vehicle, such as for maintenance.

The voltage converter 206 can be a direct current-to-direct current (DCDC) voltage converter. The voltage converter 206 can be a step-down voltage converter, such as a buck converter. The voltage converter 206 can reduce the voltage level of a DC input voltage to a lower output voltage (e.g., reduce the voltage of an input voltage from the battery 202 to a lower voltage). The voltage converter 206 can reduce the voltage by switching a power transistor on and off at a defined frequency (e.g., according to a defined duty cycle), allowing only a fraction of the input voltage to be passed through to the output of the voltage converter 206. The voltage converter 206 can provide an output to the battery 208 or directly to the loads 212 (e.g., the voltage converter 206 can be electrically coupled to the loads 212 through the fuse box 210 and not the battery 208).

The electronic control unit 204 can control the voltage converter 206 to output a specific voltage or a voltage at a setpoint (e.g., a setpoint voltage or a first setpoint). The electronic control unit 204 can control the voltage converter 206 to do so by controlling (e.g., maintaining or adjusting) the duty cycle of the voltage converter 206. For example, the electronic control unit 204 can transmit a first control signal to the voltage converter 206 to set the output voltage of the voltage converter 206 to a first setpoint (e.g., three volts) based on a defined voltage output of the battery 202 providing power to the voltage converter 206. The voltage converter 206 can transmit a second control signal to the voltage converter 206 to adjust the output voltage of the voltage converter 206 to a second setpoint (e.g., four volts) based on the defined voltage output of the battery 202.

Labels 222 and 223 can indicate the connections between the battery 208 and the voltage converter 206 and the fuse box 210. For example, the label 222 can indicate the connection between the battery 208 and the voltage converter 206. The label 223 can indicate the connection between the battery 208 and the fuse box 210.

The electronic control unit 204 can include or execute on one or more processors or computing devices. The electronic control unit 204 can be located on (e.g., be electrically connected to the circuitry of) a vehicle (e.g., the vehicle 105). The electronic control unit 204 can be remote from the vehicle and can communicate with components of the vehicle 105 over a network (e.g., a wireless network). The electronic control unit 204 can include at least one event detector 224. The electronic control unit 204 can include at least one setpoint identifier 226. The electronic control unit 204 can include at least one battery monitor 228. The electronic control unit 204 can include at least one setpoint adjuster 230. The electronic control unit 204 can include at least one data repository 232. The event detector 224, the setpoint identifier 226, the battery monitor 228, and the setpoint adjuster 230 can each include at least one processing unit or other logic device such as a programmable logic array engine, or module configured to communicate with the data repository 232 or database. The event detector 224, the setpoint identifier 226, the battery monitor 228, and the setpoint adjuster 230 can be separate components, a single component, or part of the electronic control unit 204. The electronic control unit 204 can include hardware elements, such as one or more processors, logic devices, circuits, or memory.

The data repository 232 can include one or more local or distributed databases, and can include a database management system. The data repository 232 can include computer data storage or memory and can store load data 234. The load data 234 can be or include identifications of loads that are powered by the battery 202 or the battery 208 (e.g., the loads 212). Each of the loads 212 can correspond to a power value in the load data 234 indicating the amount of power that is required to operate the respective loads. In one example, the data repository 232 can include a profile for each of the loads 212 in the load data 234. The profiles can each indicate the amount of power that is required to power the load of the profile, a current activation state of the load, or other characteristics regarding the load. The activation state of a load can indicate whether the load is currently on or operating (e.g., is activated) or is currently off or not operating (e.g., is not activated). The electronic control unit 204 can identify characteristics regarding the loads 212 from the load data 234 of the data repository 232 and use the characteristics to determine a new setpoint for the voltage converter 206.

In operation, the event detector 224 of the electronic control unit 204 can detect events. Events can be conditions that occur at the loads 212 or that otherwise trigger an adjustment to the setpoint of the voltage converter 206. In one example, an event can be an activation or a deactivation of one or more of the loads 212. The event detector 224 can detect events based on signals (e.g., messages) the electronic control unit 204 receives (e.g., receives from a processor of a vehicle in which the electronic control unit 204 is located or from a processor external to such a vehicle). For instance, the event detector 224 can detect an event responsive to receiving a signal from a processor (e.g., the processor 510) of the vehicle 105. The signal can include one or more binary values and identifiers of loads indicating the loads to be activated of the loads 212. In one example, a user can select a button to activate or use a winch and a button to activate a windshield wiper of the vehicle 105. Responsive to the selections, the processor of the vehicle 105 can transmit a message or multiple messages to the electronic control unit 204 that include binary values indicating the activation (e.g., one) of each of the windshield wiper and the winch (e.g . . . , based on the binary values corresponding to identifications of the windshield wiper and the winch in the message or messages). The event detector 224 can detect an event for the windshield wiper and an event for the winch by identifying the binary values indicating the activations. The event detector 224 can detect events for any number or type of loads. The electronic control unit 204 can activate the loads based on such messages.

The event detector 224 can detect events by monitoring the activation states of the loads 212. The event detector 224 can detect the activation of a device (e.g., a change in state of a device from inactivated to activated), for example, by polling or retrieving data from sensors that detect current flowing to the device or by polling or retrieving from the devices themselves. The event detector 224 can detect the activation of one or more of the loads 212 and update an activation state of the activated loads in the data repository 232.

The event detector 224 can detect an event based on the amount of current that is drawn by the voltage converter 206. For example, the event detector 224 can monitor (e.g., via a current reader) the current that the voltage converter 206 is currently drawing. Based on the monitoring, the event detector 224 can identify values of the current that is currently traveling through the voltage converter 206 from the battery 202. The event detector 224 can compare the values of the current with a threshold or value (e.g., a defined threshold or value). Based on the comparison, the event detector 224 can determine whether the values satisfy a condition (e.g., exceed the threshold). The event detector 224 can detect an event responsive to determining a value of the current traveling through the voltage converter 206 exceeds the threshold or defined value or otherwise satisfies the condition.

The event detector 224 can detect an event based on the state of charge or other condition of the battery 202 or the battery 208. For example, the event detector 224 can monitor or poll an IBS (e.g., the IBS 218) for the states of charge of the battery 202 or 208. The event detector 224 can detect an event responsive to one of the values indicating the state of charge of the battery 202 or the battery 208 satisfies a condition. For instance, the event detector 224 can determine the state of charge of the battery 208 exceeds a first threshold or is less than a second threshold lower than the first threshold. Responsive to either determination, the event detector 224 can detect an event to adjust the setpoint of the voltage converter 206 (e.g., in the case of the state of charge of the battery 208 exceeding the first threshold, the setpoint adjuster 230 can reduce the setpoint of the voltage converter 206 to cause the battery 208 to provide more power to the currently active loads, or, in the case of the state of charge of the battery 208 being less than the second threshold, the setpoint adjuster 230 can increase the setpoint of the voltage converter 206 to cause the battery 208 to provide less power to the currently active loads). The event detector 224 can similarly detect events, and the setpoint adjuster 230 can adjust the setpoint of the voltage converter 206 based on the state of charge of the battery 202. When the state of charge of the battery 202 exceeds a third threshold, the setpoint adjuster 230 can increase the setpoint of the voltage converter 206. When the state of charge of the battery 202 is less than a four threshold lower than the third threshold, the setpoint adjuster 230 can reduce the setpoint of the voltage converter. The event detector 224 can determine events responsive to determining the states of charge of the battery 202 or 208 exceed or are less than thresholds to facilitate the amount of energy the batteries 202 and 208 provide to the active loads based on the current states of charge of the batteries 202 and 208. The event detector 224 can similarly determine events based on any condition of the battery 202 or 208 satisfying a condition.

The event detector 224 can identify types of the events that the event detector 224 detects. The types of the events can correspond to the loads that are activated or the events that the event detector 224 detects. For example, the event detector 224 can detect a first type of event responsive to detecting a first load is activated, a second type of event responsive to detecting a second load is activated, and a third type of event responsive to determine the current drawn by the voltage converter 206 satisfies a condition. The event detector 224 can detect any type of event. The event detector 224 can identify the types of the events based on identifiers of the loads that are to be activated in the messages that the electronic control unit 204.

The setpoint identifier 226 can identify or determine setpoints. The setpoints can be setpoints indicating the voltage for the voltage converter 206 to output (e.g., output based on an input of the battery 202). The setpoints can correspond to the voltage of the battery 202 and the duty cycles of the voltage converter 206. For example, the setpoint identifier 226 can identify or determine a setpoint (e.g., a voltage output) for the voltage converter 206. The setpoint identifier 226 can determine a duty cycle (e.g., cycle for switching the voltage converter 206 on and off) based on the setpoint and the voltage of the battery 202. The setpoint identifier 226 can determine the duty cycle by dividing the setpoint by the voltage of the battery 202. The setpoint adjuster 230 can transmit a control signal to the voltage converter 206 to cause the voltage converter 206 to operate according to the determined duty cycle.

The setpoint identifier 226 can determine the setpoint for the voltage converter 206 responsive to the event detector 224 detecting an event. For example, the event detector 224 can detect an event at a load, such as an activation of a brushed motor of the loads 212. Responsive to the event detector 224 detecting the event, the setpoint identifier 226 can retrieve data (e.g., the power requirements for activation or operation) regarding the load from the data repository 232. The setpoint identifier 226 can use the data regarding the load to determine or identify a setpoint for the voltage converter 206.

The setpoint identifier 226 can determine the setpoint (e.g., a second setpoint) for the voltage converter 206 based on the activated load. To do so, the setpoint identifier 226 can identify the power requirements of the activated load. The setpoint identifier 226 can identify the power requirements of the activated load from the data for the load from the data repository 232. The setpoint identifier 226 can determine the added voltage requirements of the activated load based on the power requirements of the load by holding the current traveling to the load constant. For example, the setpoint identifier 226 can determine the added voltage requirements for the added load according to the equation:

$$P=IV$$

For example, P can be the added power to send the load to activate the load, I can be the current that is currently traveling through the voltage converter 206 or the fuse box 210, and V can be the voltage that is needed to be added to the setpoint of the voltage converter 206 to supply the activated load with enough power to operate. The setpoint identifier 226 can determine the setpoint for the voltage converter 206 based on the equation. In one example, P can be the total power of all of the activated loads of the loads 212, I can be the current traveling through the voltage converter 206 or the fuse box 210, and V can be the summed voltage output of the voltage converter 206 and the battery 208. The setpoint identifier 226 can determine a setpoint (e.g., a second setpoint) for the voltage converter 206 by determining a value for V based on the equation, and subtracting the voltage of the battery 208 from the value for V.

The setpoint identifier 226 can determine the setpoint for the voltage converter 206 based on multiple events or multiple activations of loads. For example, the event detector 224 can detect activation (e.g., changing from an inactivated state to an activated state) of multiple loads of the loads 212. Responsive to the event detector 224 detecting the activation of the multiple loads, the setpoint identifier 226 can retrieve data for the activated loads (e.g., the power requirements to power the activated loads) from the data repository 232. The setpoint identifier 226 can determine a setpoint for the voltage converter 206 based on the retrieved data such as, for example, by aggregating the power requirements (e.g., the increase in power requirements) of each of the activated loads and using the aggregated power requirements as input into the equation P=IV according to example variable definitions described above.

The setpoint identifier 226 can determine the setpoint of the voltage converter 206 responsive to detecting the current drawn by the voltage converter 206 satisfies a condition (e.g., exceeds a defined value or threshold). To do so, the setpoint identifier 226 can do so according to the equation:

$$P=IV$$

For example, P can be the total power of the activated loads of the loads 212, I can be the current drawn from the voltage converter 206, and V can be the setpoint for the voltage converter 206. The setpoint identifier 226 can identify a target current value from memory of the electronic control unit. The setpoint identifier 226 can input the target current value and value of the total power of the activated loads into the equation to determine the setpoint for the voltage converter 206. Accordingly, the setpoint identifier 226 can determine a setpoint for the voltage converter 206 that will reduce the current drawn by the voltage converter 206.

In one example, the load data 234 can be stored in the data repository 232 in a table. The table can include identifications of different loads of the loads 212 as well as the power requirements for the respective loads. Upon detecting activation of one or more of the loads 212, the setpoint identifier 226 can retrieve the power requirements of the activated loads (e.g., the newly activated loads or the previously activated loads) from the table in the data repository 232. The setpoint identifier 226 can then determine the setpoint for the voltage converter 206 based on the retrieved power requirements.

The setpoint identifier 226 can determine the setpoint for the voltage converter 206 based on the state of charge or capacity of the battery 208. For example, the battery monitor 228 can retrieve values indicating the state of charge or capacity of the battery 208 from the IBS 218. The battery monitor 228 can do so by polling the IBS 218 or when the IBS 218 automatically transmits such values to the battery monitor 228. The battery monitor 228 can detect or determine the state of charge of the battery 208 responsive to the event detector 224 detecting an event by retrieving a value for the state of charge from the IBS 218. The setpoint identifier 226 can determine the amount of power the battery 208 can provide to the activated loads of the loads 212 based on the values for the state of charge or the capacity of the battery 208. The setpoint identifier 226 can subtract the power that the battery 208 can provide to the activated loads from the total power the activated loads need to operate to determine an amount of power that is needed to be provided by the battery 202 to satisfy the operating requirements of the activated loads. The setpoint identifier 226 can use the amount of power that is needed from the battery 202 as input into the equation P=IV as described above to determine the setpoint for the voltage output of the voltage converter 206 to satisfy the operating requirements of the activated loads. Accordingly, the setpoint identifier 226 can take the current state of the battery 208 to determine the setpoint for the voltage converter 206.

The setpoint identifier 226 can determine to maintain the setpoint of the voltage converter 206 responsive to the event detector 224 detecting an event. For example, the event detector 224 can detect an event (e.g., a second event) at one or more of the loads 212. The battery monitor 228 can determine a state of charge of the battery 208. The setpoint identifier 226 can compare the state of charge of the battery 208 to a threshold (e.g., a defined threshold). Responsive to determining the state of charge of the battery 208 satisfies (e.g., exceeds) the threshold, the setpoint identifier 226 can determine to maintain (e.g., not adjust or otherwise transmit a control signal to change the setpoint) the setpoint of the voltage converter 206. Such can be advantageous, for example, to use the available voltage of the battery 208 to handle an increase in the power required to operate activated loads of the loads 212.

The setpoint identifier 226 can determine to reduce the setpoint of the voltage converter 206. The setpoint identifier 226 can do so based on the voltage of the battery 208. For example, the battery monitor 228 can determine a state of charge of the battery 208. The event detector 224 can compare the state of charge to a threshold (e.g., a defined threshold). Responsive to determining the state of charge of the battery 208 exceeds the threshold, the event detector 224 can detect an event. Responsive to the event detector 224 detecting the event, the setpoint identifier 226 can identify or determine a setpoint for the voltage converter 206 that reduces the setpoint of the voltage converter 206 (e.g., reduce by a defined amount or reduce by an amount corresponding or proportional to the amount by which the state of charge exceeds the threshold). Reducing the setpoint can cause the battery 208 to increase the power that the battery 208 provides to the loads of the loads 212.

The setpoint adjuster 230 can adjust the setpoint of the voltage converter 206. The setpoint adjuster 230 can adjust the setpoint of the voltage converter 206, for example, by transmitting a control signal to the voltage converter 206. The control signal can cause the voltage converter 206 to operate to cause the output voltage of the voltage converter 206 to be equal to the setpoint identified by the setpoint identifier 226. The voltage converter 206 can receive the control signal and operate to reduce (or increase) the voltage from the voltage of the battery 202 to the setpoint of the control signal.

The control signal can include a duty cycle for the voltage converter 206. The duty cycle can indicate a percentage of the time in which the switches of the voltage converter 206 are connected or "on." The setpoint adjuster 230 can determine the duty cycle by dividing the setpoint identified or determined by the setpoint identifier 226 by the output voltage of the battery 202. The setpoint adjuster 230 can determine the duty cycle and transmit a control signal to the voltage converter 206 to operate according to the determined duty cycle.

The setpoint adjuster 230 can increase the setpoint (e.g., adjust the setpoint from a first setpoint to a second setpoint) of the voltage converter 206 when adjusting the setpoint of the voltage converter 206. For example, the event detector 224 can detect an event of the activation of a motor within a vehicle (e.g., a motor controlling one or more loads within a vehicle). The setpoint identifier 226 can determine a setpoint for the voltage converter 206 that increases the voltage output of the voltage converter 206 to increase the power to operate the activated motor. The increase in the setpoint of the voltage converter 206 can facilitate or enable the battery 202 and the battery 208 to power the activated loads of the loads 212 without increasing the current that is traveling to the activated loads.

The setpoint adjuster 230 can adjust the setpoint of the voltage converter 206 multiple times over time. For example, the event detector 224 can detect a first event indicating the activation of first one or more loads of the loads 212. The setpoint identifier 226 can determine a second setpoint for the voltage converter 206 based on the activation of the first one or more loads. The setpoint adjuster 230 can adjust the setpoint of the voltage converter 206 from a first setpoint to a second setpoint determined by the setpoint identifier 226. The voltage converter 206 can operate based on the second setpoint (e.g., operate to output a voltage equal to the second setpoint). Subsequently, the event detector 224 can detect a second event indicating the activation of second one or more loads of the loads 212. The second one or more loads can each be different from the first one or more loads. The setpoint identifier 226 can determine a third setpoint for the voltage converter 206 based on the activation of the second one or more loads. The setpoint adjuster 230 can adjust the setpoint of the voltage converter 206 from the second setpoint to the third setpoint. The voltage converter 206 can operate based on the third setpoint (e.g., operate to output a voltage equal to the third setpoint).

The setpoint adjuster 230 can adjust the setpoint of the voltage converter 206 responsive to an activated device deactivating. For example, the event detector 224 can detect an event when a load of the loads 212 changes from an activated state to a deactivated state (e.g., receive a message from a processor containing a zero value and an identification of the load being deactivated). Responsive to the event detector 224 detecting the change in state, the setpoint identifier 226 can determine or identify a setpoint for the voltage converter 206 according to the equation P=IV where P is the total required power to power the activated loads without the power requirements of the deactivated load, I is a target current for the system 200, and V is the setpoint for the voltage converter 206. The setpoint adjuster 230 can adjust the setpoint of the voltage converter 206 based on the determined setpoint to reduce the power being provided by the battery 202.

Figure 3:
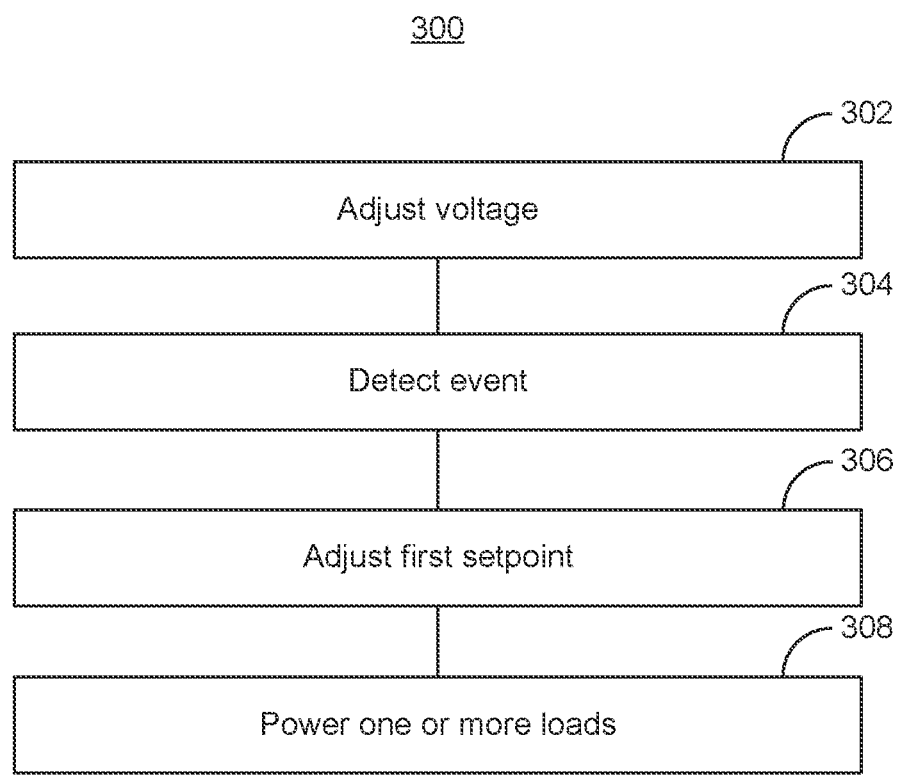
FIG. 3 depicts an example method of controlling voltage, in accordance with some implementations.

FIG. 3 depicts a method of controlling voltage, in accordance with present implementations. The method 300 can be performed by one or more components depicted in the system 200 of FIG. 2 or electronic control unit 204 of FIG. 5. For example, the method 300 can be performed by a data processing system (e.g., the electronic control unit 204, shown and described with reference to FIG. 2). The method 300 can include adjusting a voltage (ACT 302). The method 300 can include detecting an event (ACT 304). The method 300 can include adjusting a first setpoint (ACT 306). The method 300 can include powering one or more loads (ACT 308).

At ACT 302, the method 300 can include adjusting a voltage. The voltage converter 206 can adjust the voltage of the battery 202. The voltage converter 206 can adjust the voltage of the battery 202 to a first setpoint, such as 13.5V or around 13.5V. The voltage converter 206 can adjust the voltage of the battery 202 to the first setpoint responsive to receiving a control signal from the electronic control unit 204 that includes a duty cycle of operation for the voltage converter 206 for the first setpoint. The voltage converter 206 can receive current having a voltage. Switches within the voltage converter 206 can switch on and off based on the duty cycle of the control signal to cause the output voltage of the voltage converter 206 to be at the first setpoint.

At ACT 304, the method 300 can include detecting an event. The electronic control unit 204 can detect the event by, for example, detecting activation of one or more loads (e.g., loads of a vehicle, such as the vehicle 105), detecting a current exceeding a threshold at the voltage converter 206, or detecting a state of charge of the battery 208 that exceeds a threshold. The electronic control unit 204 can monitor the one or more loads, the current being drawn by the voltage converter 206 or the IBS 218 connected to the negative terminal 216 of the battery 208 to detect such events.

At ACT 306, the method 300 can include adjusting the first setpoint. Responsive to detecting the event, the electronic control unit 204 can determine a second setpoint, such as 15V or around 15V, for the voltage converter 206. The electronic control unit 204 can determine the second setpoint for the voltage converter 206 based on the power requirements of devices that were activated to cause the electronic control unit 204 to detect the event. For example, the electronic control unit 204 can identify the power requirements for the activated loads from the data repository 232. The electronic control unit 204 can identify the current traveling through the voltage converter 206 or from the battery 208 to the loads 212. The electronic control unit 204 can determine an increase in the voltage setpoint by inserting the power requirements for the activated loads and the identified current into the equation P=IV. The electronic control unit 204 can identify the current setpoint of the voltage converter 206 from memory (which the electronic control unit 204 can have stored in memory responsive to determining or transmitting a control signal for the current setpoint to the voltage converter 206). The electronic control unit 204 can add the increase in voltage to the voltage of the current setpoint of the voltage converter 206 to obtain a second setpoint for the voltage converter 206.

In another example, the electronic control unit 204 can identify or determine the total power requirements of the activated loads of the loads 212. The electronic control unit 204 can do so by retrieving data for each of the activated loads from the data repository 232 that includes the power requirements of the activated loads. The electronic control unit 204 can identify the voltage output of the battery 208 from memory as well as the current that was traveling to the loads prior to the new loads being activated. The electronic control unit 204 can input the total power and current into the equation P=IV to determine a total voltage for the battery 202 and the battery 208. The electronic control unit 204 can subtract the voltage of the battery 208 from the total voltage to obtain the second setpoint for the voltage converter 206.

Responsive to determining the second setpoint, the electronic control unit 204 can adjust the first setpoint of the voltage converter 206 to the second setpoint. The electronic control unit 204 can determine a duty cycle for the second setpoint, such as by dividing the voltage of the second setpoint by the voltage of the battery 202. The electronic control unit 204 can adjust the setpoint of the voltage converter 206 by transmitting a control signal to the voltage converter 206 that includes the determined duty cycle.

At ACT 308, the method 300 can include powering one or more loads. The battery 202 can power the activated loads of the loads 212. The battery 202 can do so in combination with the battery 208. The battery 202 can be electrically connected with the battery 208 through the voltage converter 206. The battery 208 can be electrically connected with the activated loads of the loads 212 through the fuse box 210. Energy can flow from the battery 202 and the battery 208 to power the activated loads of the loads 212. By adjusting the setpoint of the voltage converter 206, the electronic control unit 204 can power newly activated loads from the battery 202 without draining the battery 208.

Figure 4:
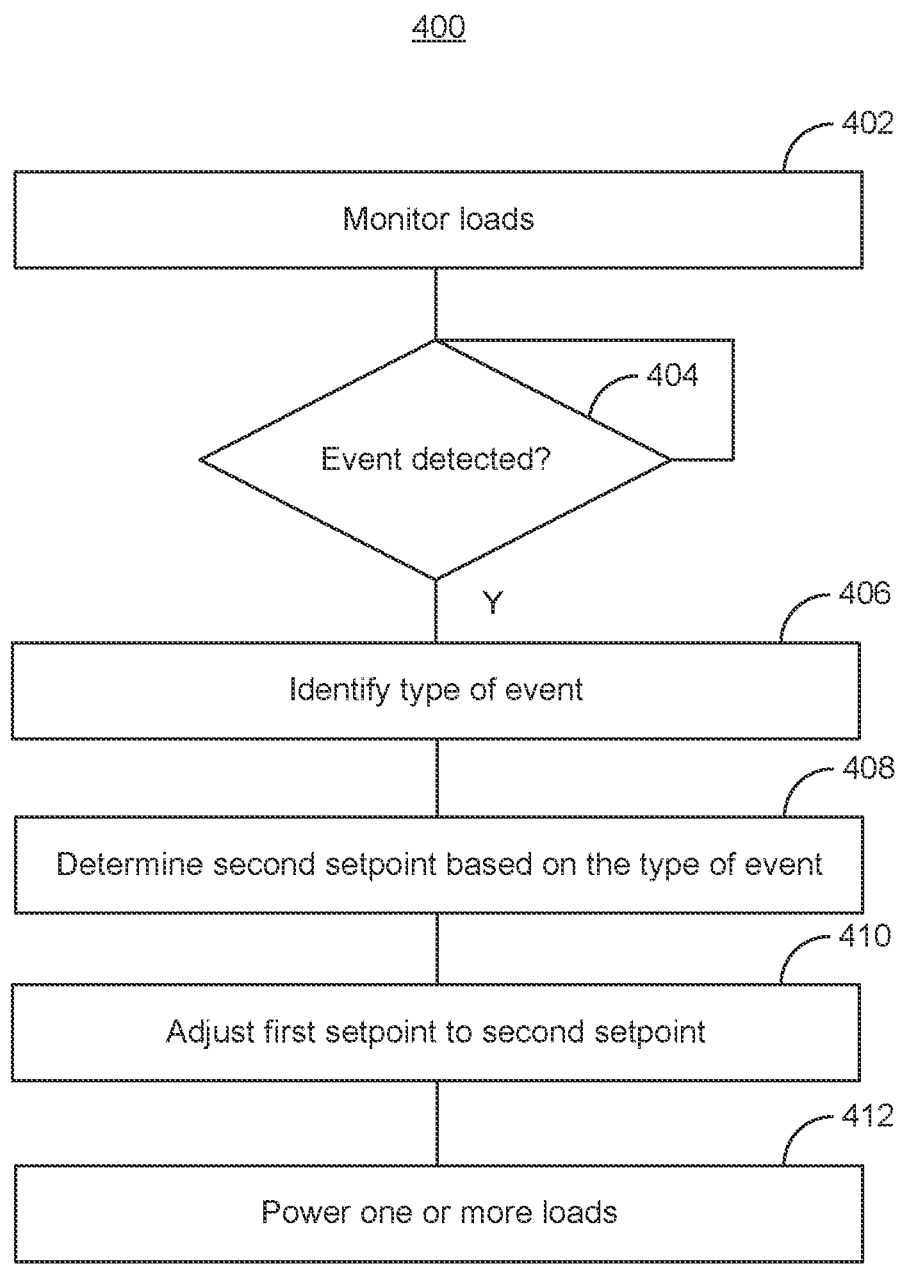
FIG. 4 depicts an example method of controlling voltage, in accordance with some implementations.

FIG. 4 depicts a method 400 of enhancing object detection capability, in accordance with present implementations. The method 400 can be performed by components depicted in the system 200 of FIG. 1. The method 400 can include monitoring loads (ACT 402). The method 400 can include determining whether an event is detected (ACT 404). The method 400 can include identifying a type of event (ACT 406). The method 400 can include determining a second setpoint based on the type of event (ACT 408). The method 400 can include adjusting a first setpoint to the second setpoint (ACT 410). The method 400 can include powering one or more loads (ACT 412).

The method 400 can include monitoring loads (ACT 402). The electronic control unit can monitor the loads 212. The loads can be devices or motors that control devices of a vehicle. The electronic control unit can monitor the loads 212 by polling sensors or the loads themselves for the current states of the loads. The electronic control unit 204 can monitor the loads 212 for changes in state (e.g., activation state) of the loads 212. The electronic control unit 204 can similarly monitor the current being drawn by the voltage converter 206.

The method 400 can include determining whether an event is detected (ACT 404). The electronic control unit 204 can determine whether an event is detected by determining whether there has been a change in state at any of the loads 212. The electronic control unit 204 can identify values that the electronic control unit 204 receives from monitoring the loads 212, the current drawn by the loads or the voltage converter 206, or the state of charge of the battery 208 from the IBS 218. The electronic control unit 204 can determine whether any of the values satisfy a condition indicating an event. Responsive to determining a value satisfies such a condition, the electronic control unit 204 can determine an event is detected.

The method 400 can include identifying a type of event (ACT 406). The electronic control unit 204 can identify the type of the event by identifying the activated load (e.g., the type of the load that was activated, determining the current exceeds a threshold, or determining the state of charge of the battery 208 satisfies a condition. Each of such determinations or identifications can be or indicate a type of event that the electronic control unit 204 can use to determine a setpoint for the voltage converter 206.

The method 400 can include determining a second setpoint based on the type of event (ACT 408). The electronic control unit 204 can determine the second setpoint according to the equation P=IV. For example, the electronic control unit 204 can identify the load that was activated, the power requirements for the load, and determine a setpoint for the voltage converter 206 based on the equation and the power requirements. In another example, the electronic control unit 204 can determine the current being drawn by the voltage converter 206 is too high. The electronic control unit 204 can identify a target current to be drawn by the voltage converter 206 and the current power requirements of the activated loads. The electronic control unit 204 can determine a voltage output for voltage converter 206 that will reduce the current that the voltage converter 206 draws to the target current while still enabling the activated loads to operate according to the equation. In another example, the electronic control unit 204 can determine the state of charge of the battery 208 is too high (e.g., above a threshold). The electronic control unit 204 can reduce the voltage setpoint of the voltage converter 206 to a lower setpoint, thus causing the battery 208 to provide more power to the currently activated loads and preserving the health of the battery 202. The electronic control unit 204 can determine the second setpoint for the voltage converter 206 based on any type of event.

The method 400 can include adjusting a first setpoint to the second setpoint (ACT 410). The electronic control unit can adjust the first setpoint of the voltage converter 206 from the first setpoint to the second setpoint by transmitting a control signal to the voltage converter 206. The control signal can include a duty cycle for the voltage converter 206 that causes the voltage converter 206 to output a voltage at the second setpoint. The voltage converter 206 can receive the control signal and operate according to the duty cycle to output a voltage at the second setpoint.

The method 400 can include powering one or more loads (ACT 412). The battery 202 can power the activated loads of the loads 212. The battery 202 can do so in combination with the battery 208. The battery 202 can be electrically connected with the battery 208 through the voltage converter 206. The battery 208 can be electrically connected with the activated loads of the loads 212 through the fuse box 210. Energy can flow from the battery 202 and the battery 208 to power the activated loads of the loads 212.

FIG. 5 depicts an example block diagram of the electronic control unit 204, in accordance with some implementations. The electronic control unit 204 can include or be used to implement an electronic control unit (e.g., a data processing system) or its components. The electronic control unit 204 can include at least one bus 505 or other communication component for communicating information and at least one processor 510 or processing circuit coupled to the bus 505 for processing information. The electronic control unit 204 can also include one or more processors 510 or processing circuits coupled to the bus for processing information. The electronic control unit 204 can also include at least one main memory 515, such as a random access memory (RAM) or other dynamic storage device, coupled to the bus 505 for storing information, and instructions to be executed by the processor 510. The main memory 515 can be used for storing information during execution of instructions by the processor 510. The electronic control unit 204 can further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions.

The electronic control unit 204 can be coupled via the bus 505 to a display 535, such as a liquid crystal display, or active matrix display, for displaying information to a user such as a driver of the vehicle 105 or other end user. An input device 530, such as a keyboard or voice interface can be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the electronic control unit 204 in response to the processor 510 executing an arrangement of instructions contained in main memory 515. Such instructions can be read into main memory 515 from another computer-readable medium, such as the storage device 525. Execution of the arrangement of instructions contained in main memory 515 causes the electronic control unit 204 to perform the illustrative processes described herein. One or more processors in a multi-processing arrangement can also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a voltage converter to adjust a voltage from a first battery to a first setpoint;
a second battery having a lower voltage than the first battery, the second battery electrically coupled between the first battery and one or more loads; and
a processor coupled with memory, the processor to:
detect a first event at the one or more loads;
responsive to detecting the first event, adjust the first setpoint to a second setpoint to power the one or more loads;
detect a second event at the one or more loads;
responsive to detecting the second event at the one or more loads, compare a state of charge of the second battery to a threshold;
determine not to adjust the second setpoint from the first setpoint for the second event based on the comparison indicating the state of charge of the second battery exceeds the threshold;
identify a type of the one or more loads;
compare the type of the one or more loads to a table including identifications of different loads of an electric vehicle and a power requirement for each of the different loads;
retrieve the power requirement for the one or more loads based on the comparison to the table; and
determine the second setpoint based on the retrieved power requirement for the one or more loads;
using the second setpoint by the voltage converter to adjust the voltage of the second battery.

2. The system of claim 1, comprising:
the first battery and the voltage converter associated with the electric vehicle; and
the first battery electrically coupled with the one or more loads of the electric vehicle via the voltage converter.

3. The system of claim 1, comprising the processor to:
monitor a state of each of the one or more loads, the state indicating whether the one or more loads are activated or inactivated;
detect a change in the state of a load of the one or more loads; and
responsive to detecting the change in the state of the load, adjust the first setpoint to the second setpoint.

4. The system of claim 1, comprising the processor to:
detect an activation of a motor controlling the one or more loads, the motor and the one or more loads associated with of the electric vehicle; and
responsive to detecting the activation of the motor, adjust the first setpoint to the second setpoint.

5. The system of claim 1, comprising the processor to:
compare a current drawn by the voltage converter with a defined value; and
responsive to the comparison satisfying a condition, adjust the first setpoint to the second setpoint.

6. The system of claim 1, the one or more loads comprising first one or more loads, and the system comprising the processor to:
subsequent to detecting the second event at the first one or more loads, detect a third event at second one or more loads; and
responsive to detecting the third event at the second one or more loads, adjust the second setpoint to a third setpoint to power the second one or more loads from the first battery.

7. The system of claim 1, the first event comprising a third event and a fourth event, and the system comprising the processor to:
detect the third event at a first load of the one or more loads and the fourth event at a second load of the one or more loads;
identify a first type of the third event and a second type of the fourth event;
identify a change in power requirements for the third event and the fourth event based on the first type and the second type; and
determine the second setpoint based on the change in power requirements for the third event and the fourth event.

8. The system of claim 1, comprising:
the second setpoint having a higher voltage than the first setpoint.

9. The system of claim 1, comprising the processor to:
detect a third event at the one or more loads;
responsive to detecting the third event at the one or more loads, determine that the state of charge of the second battery exceeds the threshold; and
responsive to determining that the state of charge of the second battery exceeds the threshold, reduce a voltage of the second setpoint to a third setpoint.

10. A method, comprising:
adjusting, by a voltage converter, a voltage from a first battery to a first setpoint;
detecting, by a processor, a first event at one or more loads;
responsive to detecting the first event, adjusting, by the processor, the first setpoint to a second setpoint;
powering the one or more loads based on the second setpoint;
detecting, by the processor, a second event at the one or more loads; and
responsive to detecting the second event at the one or more loads, comparing, by the processor, a state of charge of the second battery to a threshold;
determining, by the processor, not to adjust the second setpoint from the first setpoint for the second event based on the comparison indicating the state of charge of a second battery electrically coupled between the first battery and the one or more loads exceeds the threshold;
identifying a type of the one or more loads;
comparing the type of the one or more loads to a table including identifications of different loads of an electric vehicle and a power requirement for each of the different loads;
retrieving the power requirement for the one or more loads based on the comparison to the table; and
determining the second setpoint based on the retrieved power requirement for the one or more loads
using the second setpoint by the voltage converter to adjust the voltage of the second battery.

11. The method of claim 10, comprising:
coupling the first battery, the voltage converter, the processor, and the one or more loads with the electric vehicle; and coupling, via the voltage converter, the first battery with the one or more loads.

12. The method of claim 10, comprising:
monitoring, by the processor, a state of each of the one or more loads, the state indicating whether the one or more loads are activated or inactivated;
detecting, by the processor, a change in state of a load of the one or more loads; and
responsive to detecting the change in state of the load, adjusting, by the processor, the first setpoint to the second setpoint.

13. The method of claim 10, comprising:
determining, by the processor, the second setpoint based on the type of the one or more loads.

14. A vehicle, comprising:
a first battery electrically coupled with one or more loads of the vehicle;
a voltage converter connected to the battery and the one or more loads;
a second battery having a lower voltage than the first battery, the second battery electrically coupled between the first battery and the one or more loads;
the voltage converter to adjust a voltage from the battery to a first setpoint; and
a processor coupled with memory, the processor to:
detect a first event;
responsive to detecting the first event, adjust the first setpoint to a second setpoint to power the one or more loads;
detect a second event at the one or more loads;
responsive to detecting the second event at the one or more loads, compare a state of charge of the second battery to a threshold;
determine not to adjust the second setpoint from the first setpoint for the second event based on the comparison indicating the state of charge of the second battery exceeds the threshold;
identify a type of the one or more loads;
compare the type of the one or more loads to a table including identifications of different loads of an electric vehicle and a power requirement for each of the different loads;
retrieve the power requirement for the one or more loads based on the comparison to the table; and
determine the second setpoint based on the retrieved power requirement for the one or more loads
using the second setpoint by the voltage converter to adjust the voltage of the second battery.

15. The vehicle of claim 14, comprising the processor to:
monitor a state of each of the one or more loads, the state indicating whether the one or more loads are activated or inactivated;
detect a change in the state of a load of the one or more loads; and
responsive to detecting the change in the state of the load, adjust the first setpoint to the second setpoint.

16. The vehicle of claim 14, comprising the processor to:
determine the second setpoint based on the type of the one or more loads.

17. The vehicle of claim 14, comprising the processor to:
detect an activation of a motor controlling the one or more loads, the motor and the one or more loads associated with of the vehicle; and
responsive to detecting the activation of the motor, adjust the first setpoint to the second setpoint.

* * * * *